United States Patent
Sukhov et al.

(10) Patent No.: US 12,394,029 B2
(45) Date of Patent: Aug. 19, 2025

(54) METHOD AND SYSTEM FOR ADJUSTING A DIGITAL ELEVATION MODEL

(71) Applicant: YANDEX EUROPE AG, Lucerne (CH)

(72) Inventors: Dmitry Aleksandrovich Sukhov, Podolsk (RU); Nikolay Alekseevich Fedorov, Kotelniki (RU); Roman Evgenevich Sokolov, Naberezhnyye Chelny (RU)

(73) Assignee: Y.E. Hub Armenia LLC, Yerevan (AM)

( * ) Notice: Subject to any disclaimer, the term of this patent is extended or adjusted under 35 U.S.C. 154(b) by 462 days.

(21) Appl. No.: 18/082,078

(22) Filed: Dec. 15, 2022

(65) Prior Publication Data
US 2023/0206408 A1    Jun. 29, 2023

(30) Foreign Application Priority Data

Oct. 18, 2021    (RU) ................................ 2021130268

(51) Int. Cl.
*G06T 17/05*    (2011.01)
*G06T 5/50*    (2006.01)
(Continued)

(52) U.S. Cl.
CPC ................ *G06T 5/80* (2024.01); *G06T 5/50* (2013.01); *G06T 7/344* (2017.01);
(Continued)

(58) Field of Classification Search
CPC .. G06T 5/80; G06T 5/50; G06T 7/344; G06T 2207/10032; G06T 2207/20081;
(Continued)

(56) References Cited

U.S. PATENT DOCUMENTS

| 10,358,234 B2 | 7/2019 | Nixon |
| 2015/0042648 A1 | 2/2015 | Jung et al. |

(Continued)

FOREIGN PATENT DOCUMENTS

| CN | 103218783 A | 7/2013 | |
| CN | 110322557 A * | 10/2019 | ........... G06K 9/6288 |

(Continued)

OTHER PUBLICATIONS

Russian Search Report dated Dec. 8, 2023 issued in respect of the counterpart Russian Patent Application No. RU 2021130268.

*Primary Examiner* — John Villecco
*Assistant Examiner* — Kyla Guan-Ping Tiao Allen
(74) *Attorney, Agent, or Firm* — BCF LLP

(57) ABSTRACT

A method and system for adjusting a digital elevation model (DEM). A satellite image with one or more roads and the DEM are received. The DEM includes an elevation of each pixel of the satellite image. Recorded GPS data corresponding to the one or more roads is received. A pixel in the satellite image corresponding to the one or more roads is determined. A determination is made as to whether the location of the pixel corresponds to the GPS data. After determining that the location of the pixel does not correspond to the GPS data, a set of pixels is determined in the DEM that surround the pixel. The elevation of each pixel of the set of pixels of the DEM is adjusted so that the location of the pixel in the satellite image corresponds to the one or more roads.

20 Claims, 8 Drawing Sheets

(51) Int. Cl.
*G06T 5/80* (2024.01)
*G06T 7/33* (2017.01)

(52) U.S. Cl.
CPC ............... *G06T 2207/10032* (2013.01); *G06T 2207/20081* (2013.01); *G06T 2207/30184* (2013.01)

(58) Field of Classification Search
CPC . G06T 2207/30184; G06T 17/05; G06T 3/06; G06V 20/13; G06F 16/29; G06F 16/215; G06F 16/23
See application file for complete search history.

(56) References Cited

U.S. PATENT DOCUMENTS

| | | | |
|---|---|---|---|
| 2018/0188384 A1* | 7/2018 | Ramanandan | G01S 19/47 |
| 2020/0302250 A1 | 9/2020 | Chu et al. | |
| 2022/0398709 A1* | 12/2022 | Gudavalli | G06T 7/0002 |

FOREIGN PATENT DOCUMENTS

| | | | | | |
|---|---|---|---|---|---|
| JP | 2012511697 | A | * | 5/2012 | ............ G01C 7/04 |
| KR | 2021102182 | A | * | 8/2021 | ......... G06K 9/00201 |
| KR | 20210095479 | A | | 8/2021 | |
| RU | 2571871 | C2 | | 12/2015 | |

* cited by examiner

300

METHOD AND SYSTEM FOR ADJUSTING A DIGITAL ELEVATION MODEL

CROSS-REFERENCE

The present application claims priority to Russian Patent Application No. 2021130268, entitled "Method and System for Adjusting a Digital Elevation Model", filed Oct. 18, 2021, the entirety of which is incorporated herein by reference.

FIELD OF TECHNOLOGY

The present technology relates to satellite imagery and, more specifically, to methods and systems for adjusting a digital elevation model used to orthorectify a satellite image.

BACKGROUND

Satellite imagery is used for many applications, such as for navigation. Pixels of a satellite image may be affected by various distortions. The distortions can be caused by the photography system being used to capture the satellite image, the position of the satellite, the angle of the satellite, the elevation of the terrain in the image, obstructions, and/or other effects.

Prior to using a captured satellite image, the satellite image may be orthorectified to align each pixel of the satellite image with its proper position on the ground. The orthorectifying process may assign a physical location to each pixel in the satellite image. This process may reduce the effects of distortions, but satellite images often still include errors even after orthorectification. These errors can be problematic for systems using the satellite images, such as vehicles using the satellite images for navigation. For the foregoing reasons, there is a need for new methods and systems for correcting satellite images.

U.S. Pat. No. 9,378,585 issued to University of Seoul Industry Cooperation Foundation, on Jun. 28, 2016, discloses a technique for correcting a geometric image error calculated as a rational polynomial coefficient (RPC) only through a corresponding point extracted from a digital elevation model (DEM) and a stereoscopic image without direct measurement of a ground control point (GCP). To this end, a system for automatic geometric correction using an RPC in accordance with the present invention comprises: an auxiliary data extraction unit; a corresponding point extraction unit; a first ground coordinate extraction unit; a second ground coordinate extraction unit; an RPC correction model generation unit; and an image distortion correction unit. The auxiliary data extraction unit extracts two or more different images captured from the same ground surface and auxiliary data of the two or more different images. The corresponding point extraction unit extracts a corresponding point from the two or more different images through image matching. The first ground coordinate extraction unit extracts first ground coordinates from the corresponding point and an RPC model of the auxiliary data. The second ground coordinate extraction unit extracts second ground coordinates by using the first ground coordinates and a correlation coefficient of a DEM. The RPC correction model generation unit generates an RPC correction model by correcting the RPC model on the basis of the second ground coordinates. The image distortion correction unit corrects distortion of an image by allocating ground coordinates to each image coordinates of the image by using the second ground coordinates and the RPC correction model.

SUMMARY

Developers of the present technology have appreciated that the effect of distortions on satellite images may be reduced and/or corrected based on global positioning system (GPS) data recorded by GPS systems in vehicles (or other user wireless devices). GPS data collected over the course of multiple vehicle trips may be aggregated. Roads in the satellite images may be identified, such as by using computer vision techniques. The pixels corresponding to the roads may be identified.

The GPS data collected by the GPS systems may be compared to the roads identified in the satellite image in order to determine an amount of error in the satellite image. If the recorded GPS data does not overlap with the roads in the satellite image, then the satellite image may be found to have a high level of error. Conversely, if the GPS data does overlap with the roads in the satellite image, the satellite image may be found to have a lower amount of error.

In order to reduce the amount of error in a satellite image, a shift may be applied to the satellite image. Each pixel in the satellite image may be assigned a rational polynomial coefficient (RPC) that indicates a geographic location corresponding to the pixel. The shift may be applied to all RPCs of the satellite image. In order to determine the shift to apply to the RPCs of the satellite image, multiple variants of the satellite image may be generated. Each variant of the satellite image may be generated by applying a different shift to the RPCs. An amount of error may be calculated for each variant by determining an amount of overlap between the GPS data and the roads in that variant of the satellite image. The variant with the lowest amount of error may be selected, and the shift corresponding to that variant may be applied to all of the RPCs of the satellite image.

To further correct the satellite image, a digital elevation model (DEM) used to orthorectify the satellite image may be adjusted. Each pixel of the DEM may indicate an elevation of a corresponding pixel or area in the satellite image. Pixels of the satellite image that contain roads may be identified. For each pixel, a set of candidate pixel values may be generated. The candidate pixel values may be generated using a smoothing algorithm. For each candidate pixel value, an amount of error may be calculated when the value of the candidate pixel is used to orthorectify the satellite image. The candidate pixel value that has the lowest amount of error may be selected, and that candidate pixel value may be assigned to the pixel in an adjusted DEM.

Embodiments of the present technology have been developed based on developers' appreciation of at least one technical problem associated with the prior art solutions. Therefore, developers have devised methods and systems for adjusting a DEM. Moreover, developers have devised methods and systems that allow a more accurate placement of roads in a satellite image by adjusting a DEM based on collected GPS data from vehicles traveling on the roads.

In a first broad aspect of the present technology, there is provided a method comprising: receiving a satellite image comprising one or more roads and a digital elevation model (DEM) comprising an elevation of each pixel of the satellite image; receiving recorded global positioning system (GPS) data corresponding to the one or more roads; determining a pixel in the satellite image corresponding to the one or more roads; determining whether a location of the pixel in the satellite image corresponds to the GPS data; after determining that the location of the pixel in the satellite image does not correspond to the GPS data, determining a set of pixels of the DEM that surround the pixel in the satellite image;

and adjusting an elevation of each pixel of the set of pixels of the DEM so that the location of the pixel in the satellite image corresponds to the one or more roads.

In some implementations of the method, adjusting the elevation of each pixel comprises: randomly selecting elevations for each pixel of the set of pixels; applying the randomly selected elevations to the DEM; after applying the randomly selected elevations to the DEM, determining whether the location of the pixel in the satellite image corresponds to the one or more roads; and after determining that the location of the pixel in the satellite image corresponds to the one or more roads, storing the randomly selected elevations in the DEM. In some implementations of the method, the method further comprises determining a second set of pixels corresponding to roads in the satellite image; and selecting, from the second set of pixels corresponding to roads in the satellite image, the pixel in the satellite image.

In some implementations of the method, determining the second set of pixels corresponding to roads in the satellite image comprises: inputting the satellite image into a trained machine learning algorithm (MLA); and outputting, by the MLA, the second set of pixels corresponding to roads in the satellite image.

In some implementations of the method, the trained MLA was trained using a set of satellite images, wherein each satellite image in the set of satellite images comprises a label indicating which pixels of the respective satellite image correspond to roads in the respective satellite image.

In some implementations of the method, the method further comprises determining a rational polynomial coefficient (RPC) corresponding to the pixel in the satellite image.

In some implementations of the method, determining whether the location of the pixel in the satellite image corresponds to the GPS data comprises: determining, based on the RPC, a GPS coordinate corresponding to the pixel in the satellite image; and comparing the GPS coordinate of the pixel in the satellite image to the GPS data to determine whether the GPS coordinate corresponds to a road.

In some implementations of the method, adjusting the elevation of each pixel comprises: randomly selecting elevations for each pixel of the set of pixels; applying the randomly selected elevations to the DEM; determining a second RPC corresponding to the pixel in the satellite image; determining, based on the second RPC, a second GPS coordinate corresponding to the pixel in the satellite image; comparing the second GPS coordinate of the pixel in the satellite image to the GPS data to determine whether the second GPS coordinate corresponds to a road; and after determining that the second GPS coordinate corresponds to the road, storing the randomly selected elevations in the DEM.

In some implementations of the method, the recorded GPS data comprises GPS coordinates recorded by a plurality of electronic devices traveling on the one or more roads.

In some implementations of the method, the plurality of electronic devices are associated with vehicles traveling on the one or more roads.

In some implementations of the method, the recorded GPS data is generated by: receiving GPS coordinates recorded by a plurality of vehicles traveling on the one or more roads; and removing outliers from the GPS coordinates.

In another broad aspect of the present technology, there is provided a method comprising: receiving a satellite image comprising one or more roads, a digital elevation model (DEM) comprising an elevation of each pixel of the satellite image; receiving recorded global positioning system (GPS) data corresponding to the one or more roads; determining, based on the GPS data, a shift to apply to the satellite image; selecting a pixel in the DEM; determining, based on pixels surrounding the pixel, a plurality of candidate pixel values of the pixel; determining, for each candidate pixel value of the plurality of candidate pixel values, an amount of error corresponding to the respective candidate pixel value; selecting a candidate pixel value having a lowest amount of error of the plurality of candidate pixel values; and generating, based on the selected candidate pixel value, an adjusted DEM.

In some implementations of the method, the method further comprises generating, based on the adjusted DEM, a corrected satellite image.

In some implementations of the method, the method further comprises receiving rational polynomial coefficients (RPCs) corresponding to the satellite image, and wherein determining the shift to apply to the satellite image comprises: generating a plurality of variants of the RPCs; determining, for each variant of the plurality of variants, an amount of error based on the GPS data; and selecting a variant of the plurality of variants having a smallest amount of error, wherein the variant corresponds to the shift; and applying the shift to the RPCs.

In some implementations of the method, determining the plurality of candidate pixel values comprises applying a smoothing algorithm to the pixel and the pixels surrounding the pixel.

In some implementations of the method, determining the amount of error comprises determining an indication of overlap between the one or more roads and the GPS data.

In another broad aspect of the present technology, there is provided a method comprising: receiving a satellite image comprising one or more roads, a digital elevation model (DEM) comprising an elevation of each pixel of the satellite image; receiving recorded global positioning system (GPS) data corresponding to the one or more roads; selecting a pixel in the DEM; generating a plurality of candidate pixel values of the pixel; determining, for each candidate pixel value of the plurality of candidate pixel values, an amount of error corresponding to the respective candidate pixel value; selecting a candidate pixel value having a lowest amount of error of the plurality of candidate pixel values; and generating, based on the selected candidate pixel value, an adjusted DEM.

In some implementations of the method, determining the amount of error for a respective candidate pixel value comprises: determining a set of pixels surrounding the pixel; determining, for the set of pixels, an amount of overlap between the GPS data and the set of pixels; and determining, based on the amount of overlap, the amount of error for the respective candidate pixel value.

In some implementations of the method, each candidate pixel value is within a pre-determined range of the pixel.

In some implementations of the method, the method further comprises generating, based on the adjusted DEM, a corrected satellite image.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server."

In the context of the present specification, "electronic device" may be any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. Some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" may be any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology may each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
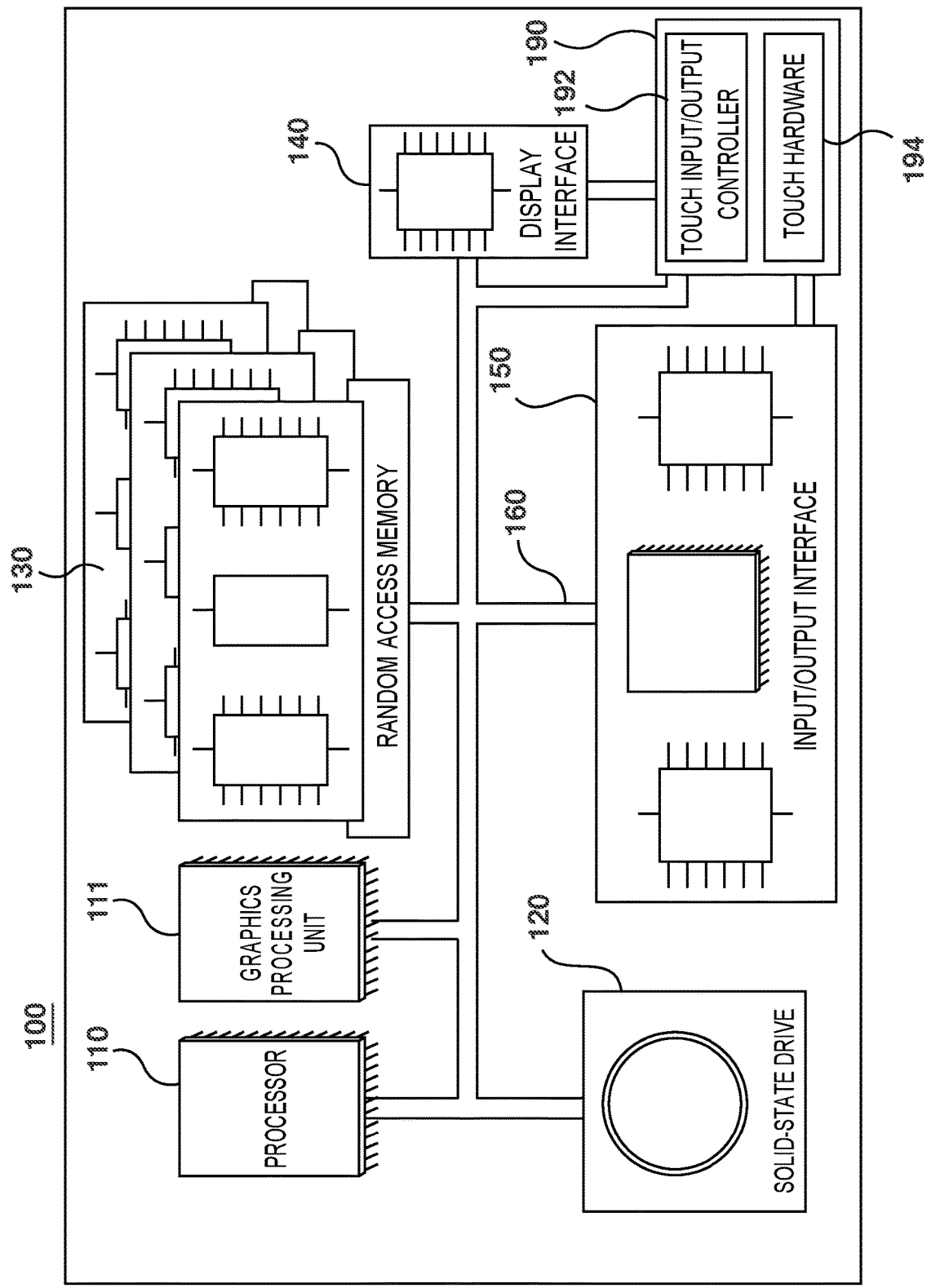
FIG. 1 depicts a schematic diagram of an example computer system for implementing non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labelled as a "processor," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application-specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, there is shown a computer system 100 suitable for use with some implementations of the present technology. In some embodiments, the computer system 100 may be implemented by any of a conventional personal computer, a network device and/or an electronic device (such as, but not limited to, a mobile device, a tablet device, a server, a controller unit, a control device, etc.), and/or any combination thereof appropriate to the relevant task at hand. In some embodiments, the computer system 100 comprises various hardware components including one or more single or multi-core processors collectively represented by processor 110, a solid-state drive 120, a random access memory 130, and an input/output interface 150. The computer system 100 may be a computer specifically designed to operate a machine learning algorithm (MLA). The computer system 100 may be a generic computer system.

In some embodiments, the computer system 100 may also be a subsystem of one of the above-listed systems. In some other embodiments, the computer system 100 may be an "off-the-shelf" generic computer system. In some embodiments, the computer system 100 may also be distributed amongst multiple systems. The computer system 100 may also be specifically dedicated to the implementation of the present technology. As a person in the art of the present technology may appreciate, multiple variations as to how the computer system 100 is implemented may be envisioned without departing from the scope of the present technology.

Those skilled in the art will appreciate that processor 110 is generally representative of a processing capability. In some embodiments, in place of or in addition to one or more conventional Central Processing Units (CPUs), one or more specialized processing cores may be provided. For example, one or more Graphic Processing Units 111 (GPUs), Tensor Processing Units (TPUs), and/or other so-called accelerated processors (or processing accelerators) may be provided in addition to or in place of one or more CPUs.

System memory will typically include random access memory 130, but is more generally intended to encompass any type of non-transitory system memory such as static random access memory (SRAM), dynamic random access memory (DRAM), synchronous DRAM (SDRAM), read-only memory (ROM), or a combination thereof. Solid-state drive 120 is shown as an example of a mass storage device, but more generally such mass storage may comprise any type of non-transitory storage device configured to store data, programs, and other information, and to make the data, programs, and other information accessible via a system bus 160. For example, mass storage may comprise one or more of a solid state drive, hard disk drive, a magnetic disk drive, and/or an optical disk drive.

Communication between the various components of the computer system 100 may be enabled by a system bus 160 comprising one or more internal and/or external buses (e.g., a Peripheral Component Interconnect (PCI) bus, universal serial bus, Institute of Electrical and Electronics Engineers (IEEE) 1394 "Firewire" bus, Small Computer System Interface (SCSI) bus, Serial Advanced Technology Attachment (Serial-ATA) bus, etc.), to which the various hardware components are electronically coupled.

The input/output interface 150 may provide networking capabilities such as wired or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example the networking interface may implement specific physical layer and data link layer standards such as Ethernet, Fibre Channel, Wi-Fi, Token Ring or Serial communication protocols. The specific physical layer and the data link layer may provide a base for a full network protocol stack, allowing communication among small groups of computers on the same local area network (LAN) and large-scale network communications through routable protocols, such as Internet Protocol (IP).

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal or external buses 160. In some embodiments, the input/output interface 150 may be connected to a keyboard (not shown), a mouse (not shown) or a trackpad (not shown) allowing the user to interact with the computer system 100 in addition to or instead of the touchscreen 190.

According to some implementations of the present technology, the solid-state drive 120 stores program instructions suitable for being loaded into the random access memory 130 and executed by the processor 110 for executing acts of one or more methods described herein. For example, at least some of the program instructions may be part of a library or an application.

Figure 2:
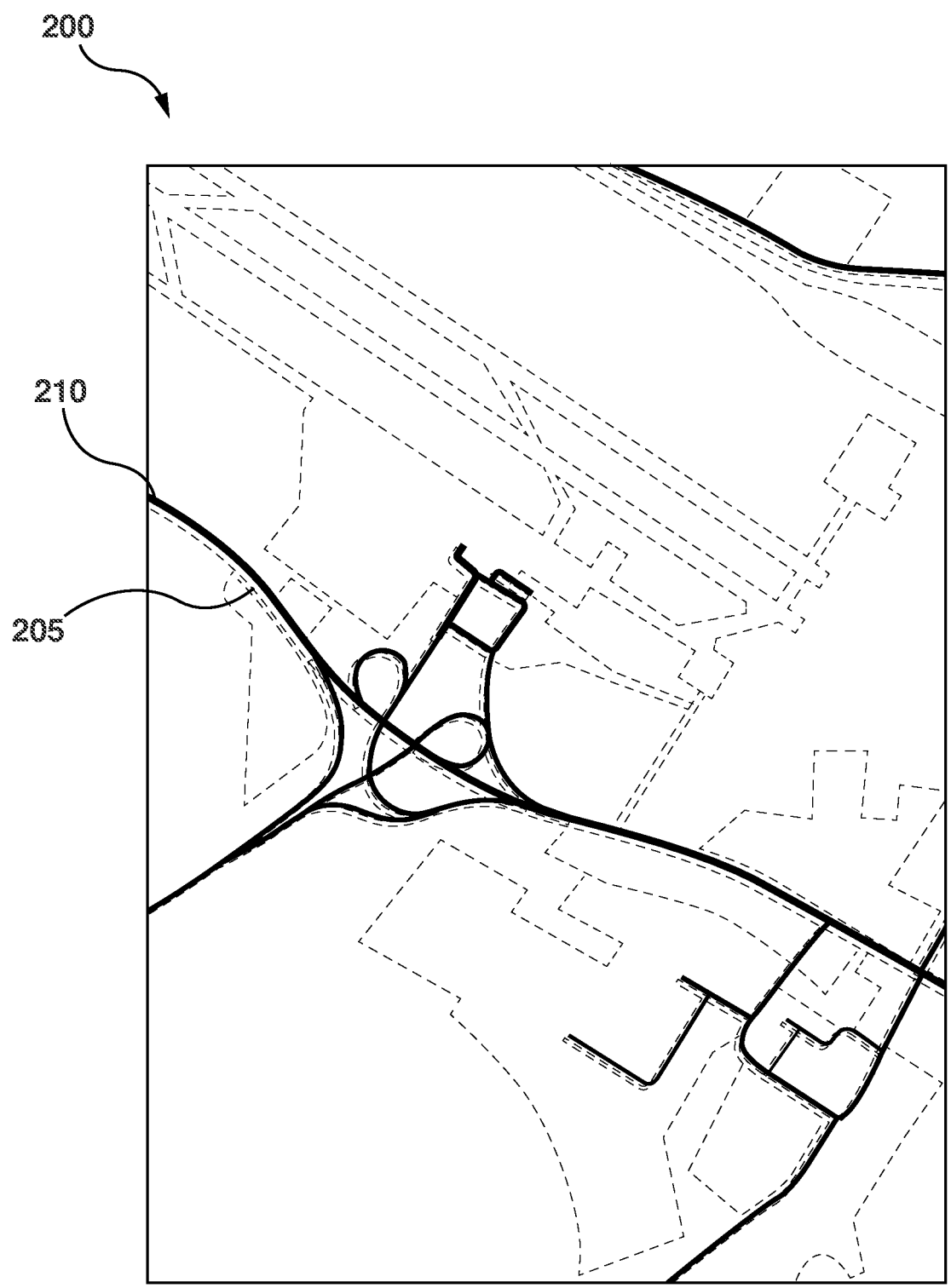
FIG. 2 depicts a satellite image according to some embodiments of the present technology.

FIG. 2 depicts a satellite image 200 according to some embodiments of the present technology. The satellite image 200 may be captured by one or more satellites in orbit around the earth. Although described herein as a satellite image 200, it should be understood that the satellite image 200 may be captured by any other airborne photographic system. The satellite image 200 may be captured by an unmanned aerial apparatus (i.e. a drone), balloon apparatus, captured from an airplane, and/or captured by any other airborne device. Any reference herein to a satellite image is intended to include images taken by a satellite, any other airborne device, and/or any type of aerial photography.

The satellite image 200 may be a single image or may be a composite of multiple images. The multiple images may come from a single source or multiple sources. The satellite image 200 includes roads 205. The roads 205 may be public roads and/or private roads.

Overlaid on the satellite image 200 is collected GPS data 210. The collected GPS data 210 may be data that was collected from vehicles traveling over the roads 205. Vehicles may include integrated GPS devices or GPS devices that are traveling in the vehicle. For example the driver of the vehicle may have a smartphone that includes a GPS. The GPS device of a vehicle may record the position of the vehicle as it travels over the roads 205. For example GPS coordinates of the vehicle may be recorded at a predetermined interval and/or each time a new position of the vehicle is determined.

The GPS data 210 may be collected and stored from multiple vehicles traveling over the roads 205 and/or multiple trips over the roads 205. The vehicles and/or devices may transmit the recorded GPS coordinates to a central server. The server may store the collected GPS coordinates in a database. The collected GPS coordinates may be filtered and/or processed to generate the GPS data 210. The collected GPS coordinates may be filtered to remove data that was collected before a specific date and/or time. For example GPS coordinates collected within the last year may be used to form the GPS data 210. The collected GPS coordinates may be filtered to remove outliers. In some instances, erroneous GPS readings may occur, such as due to weather effects. Removing outliers may remove GPS coordinates that are not accurate.

As can be seen in the satellite image 200, the GPS data 210 is, in some areas, misaligned with the roads 205. This may be due to errors in the satellite image 200 and/or errors in the GPS data 210. If a sufficient number of GPS data 210 is collected, it may be assumed that the misalignment is caused by errors in the satellite image 200. Using the methods described below, the satellite image 200 may be corrected based on the GPS data 210.

Figure 3:
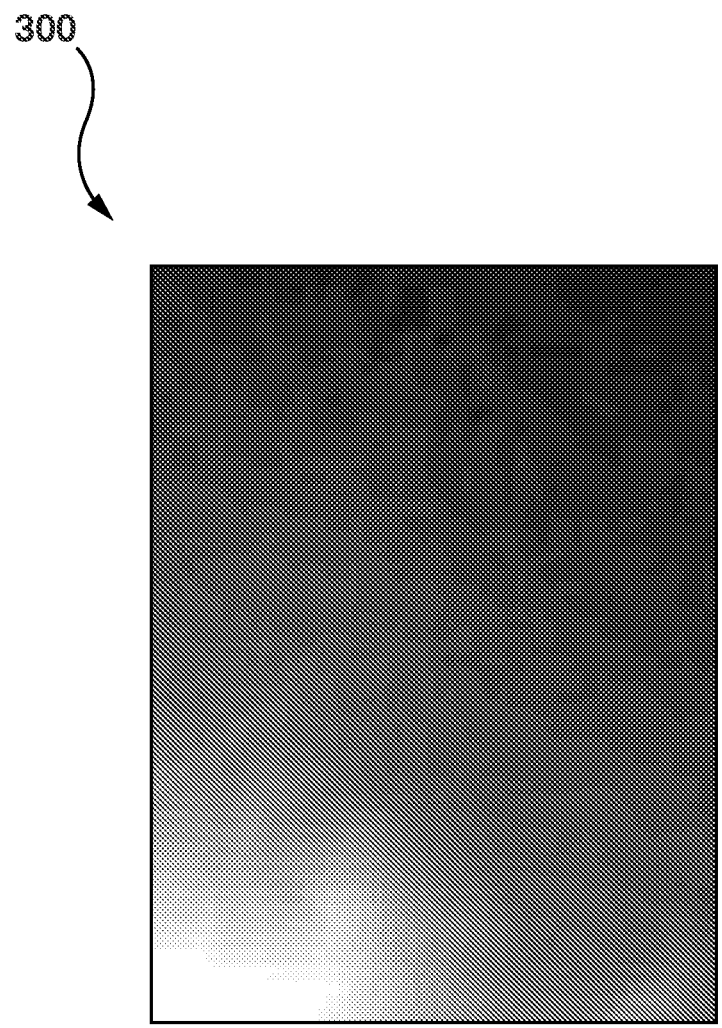
FIG. 3 depicts a digital elevation model (DEM) according to some embodiments of the present technology.

FIG. 3 depicts a digital elevation model (DEM) 300 according to some embodiments of the present technology. A raw satellite image may be modified using a process called orthorectification. Orthorectification may alter the satellite image to correct for various geometric inaccuracies in the satellite image, such as inaccuracies caused by the tilt of the satellite or other apparatus capturing the image, terrain effects of the earth, inaccuracies introduced by the sensor capturing the image, and/or other effects. Orthorectification may result in a more accurate version of the satellite image, where geographic features in the satellite image are located closer to their actual positions on earth.

Orthorectification may account for geometric distortion caused by terrain effects, such as relief displacement. Variable elevation can cause a shift in a feature's apparent position in an image. This variation in terrain can be accounted for during orthorectification using a DEM, such as the DEM 300. The DEM 300 is a representation of the topographic surface of the earth. The DEM 300 includes height information about the surface of the earth. The DEM 300 might not include any other information about the surface of the earth other than elevation.

In the DEM 300, each pixel corresponds to a geographic area on the earth. Each pixel of the DEM 300 may be assigned a pixel value, which indicates an elevation of the geographic area corresponding to the pixel. The geographic area corresponding to each pixel may be a same size. A DEM may be a grayscale image, color image, or in any other suitable format. The illustrated DEM 300 is a grayscale image. Each pixel in the DEM 300 may be assigned a pixel value, which may be the brightness of the pixel. The pixel values may have any range, such as from 0 (black) to 255 (white). The pixel value (i.e. brightness) of each pixel of the DEM 300 may indicate an elevation of a corresponding location in the satellite image 200. These pixel values in the DEM 300 may be used to adjust the satellite image 200 during orthorectification.

The DEM 300 illustrates one method of storing topographical information corresponding to a satellite image, but it should be understood that any other suitable method may be used. For example, the DEM 300 could be stored as a three-dimensional model, a relief map, and/or in any other format. The DEM 300 may be recorded by the same satellite that captured the satellite image 200 or a different satellite. The DEM 300 may be captured by any suitable airborne apparatus, such as an airplane. The DEM 300 may be generated using multiple data sources, such as data collected by multiple satellites.

The DEM 300 may be used during the orthorectification process. The pixel values of the DEM 300 may affect the position of the roads 205 in the satellite image 200. As discussed in further detail below, the DEM 300 may be adjusted to align the GPS data 210 with the roads 205.

Figure 4:
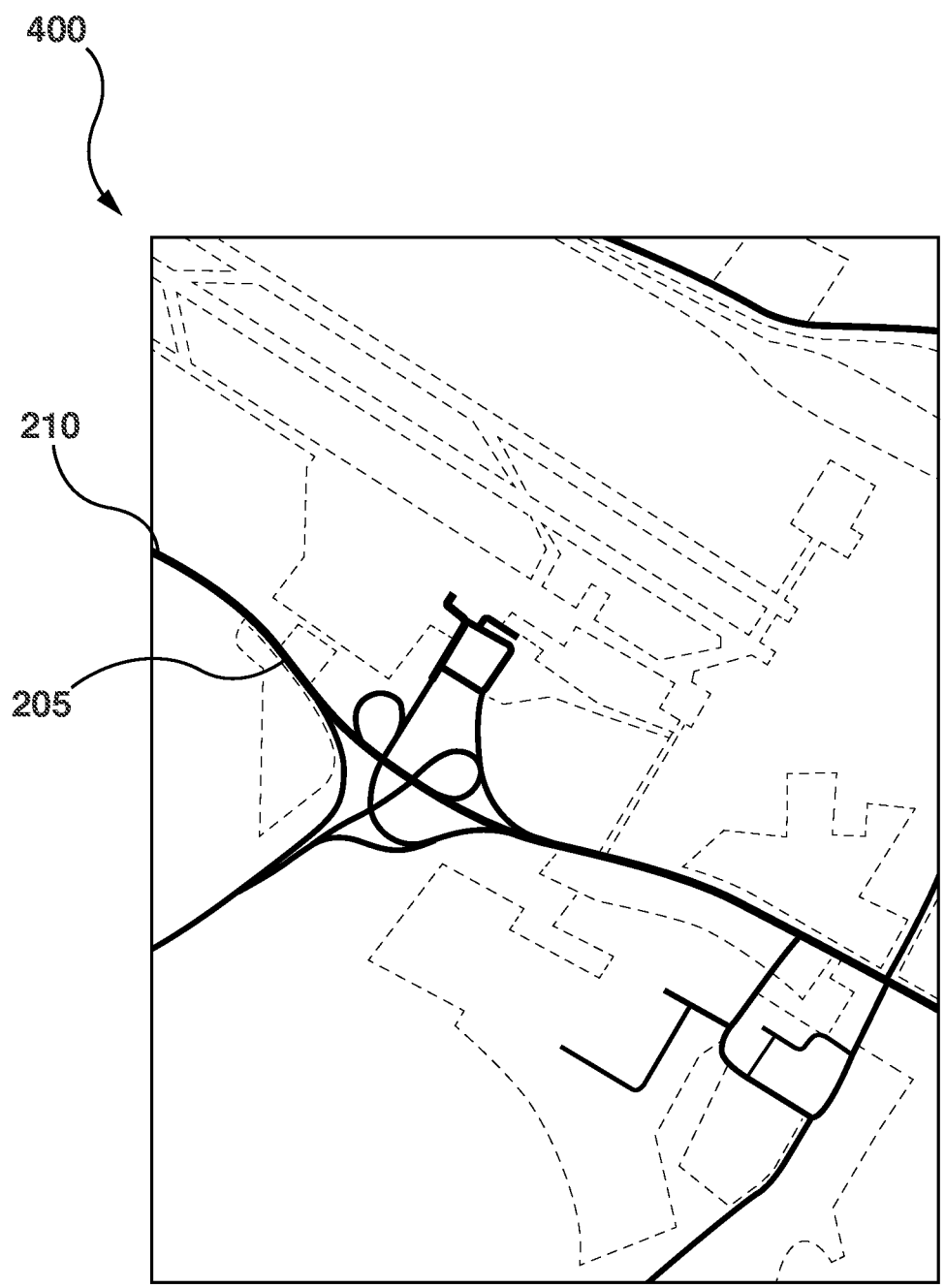
FIG. 4 depicts a corrected satellite image according to some embodiments of the present technology.

FIG. 4 depicts a corrected satellite image 400 according to some embodiments of the present technology. The corrected satellite image 400 has been orthorectified using an adjusted DEM. The DEM may have been adjusted so that, after orthorectification, the GPS data 210 is now aligned with the roads 205. For some purposes, it may be particularly important to have satellite images with correctly positioned roads. Described below are methods for adjusting the DEM to align collected GPS data 210 with the roads 205.

Method for Correcting a Satellite Image
(Non-Limiting Embodiment)

Figure 5:
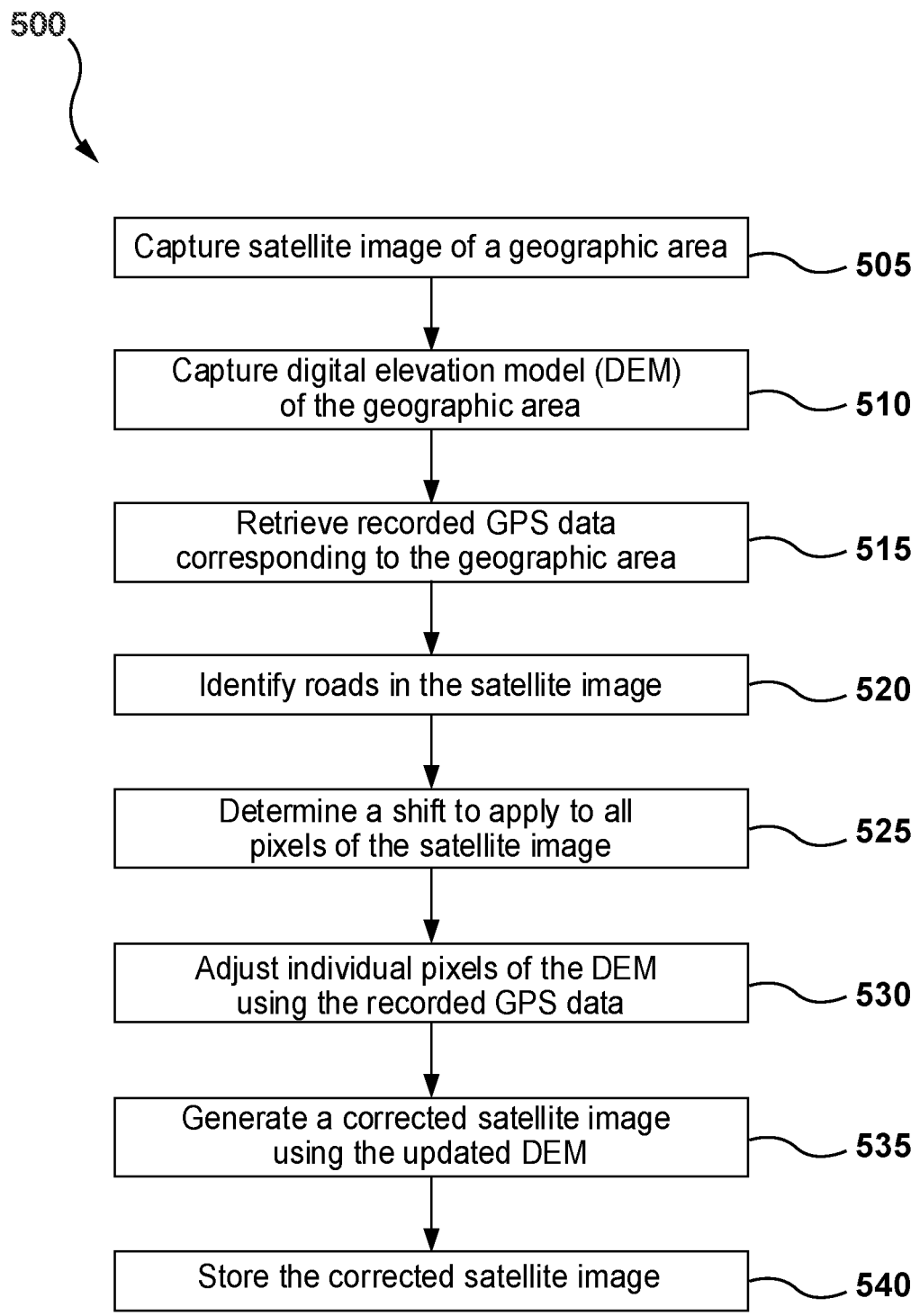
FIG. 5 is a flow diagram of a method for correcting a satellite image according to some embodiments of the present technology.

FIG. 5 is a flow diagram of a method 500 for correcting a satellite image according to some embodiments of the present technology. In one or more aspects, the method 500 or one or more steps thereof may be performed by a computing system, such as the computer system 100.

The method 500 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

Step 505: Capture Satellite Image of a Geographic Area

At step 505 an image of a geographic area may be captured. The image may be a satellite image, an image captured by aerial photography, and/or any other type of image having an overhead view of the geographic area. The image may be a composite of multiple images. Information about the capture of the image may be recorded, such as a date and time of capture, an angle of the apparatus capturing the image, and/or any other information about the apparatus capturing the image. The tilt of the satellite capturing the image may be recorded and/or other information about the satellite may be recorded. As described above, the satellite image may contain various inaccuracies. The inaccuracies may be caused by various factors including the varying elevation of the geographic area.

Rational polynomial coefficients (RPCs) may be generated for and/or retrieved for the satellite image. The RPCs may describe how the two-dimensional satellite image is translated to three-dimensional surface coordinates of the earth. The RPC of a pixel of the satellite image may indicate coordinates of the surface location corresponding to that pixel. The coordinates may be in any format, such as latitude and longitude. The RPC of a pixel may be used to calculate the latitude and longitude corresponding to that pixel.

Step 510: Capture DEM of the Geographic Area

At step 510 a DEM of the geographic area may be captured. The DEM may be captured by the same satellite that captures the satellite image at step 505 or a different satellite or other airborne apparatus. The DEM may be captured at the same time as the satellite image or at a different time. The DEM may be generated based on multiple data sources, such as data collected by multiple satellites. The DEM may be generated using lidar, radar, stereo photogrammetry, and/or any other suitable technique for determining an elevation of the geographic area. The DEM and/or satellite image may be retrieved from a database.

The DEM may indicate an elevation of locations in the satellite image. The DEM may be an image containing pixels, where each pixel has been assigned a pixel value. The pixel value may be a shade of the pixel. The pixel value may indicate an elevation of a geographic area corresponding to the pixel.

Step 515: Retrieve Recorded GPS Data

At step 515 data indicating the locations of roads in the geographic area may be retrieved. The data may be recorded GPS data corresponding to the geographic area. The recorded GPS data may have been recorded by devices traveling in vehicles on roads in the geographic area. The GPS data may be collected from GPS devices integrated in the vehicles and/or GPS devices traveling in the vehicles such as mobile phones. The recorded GPS data may be collected by a navigation application operating on a driver's or passenger's mobile device. The GPS data may be transmitted from the navigation application to a cloud system. Although described as GPS data, the data may be recorded by any satellite navigation system, including GLONASS, BeiDou, and/or Galileo. The GPS data may be retrieved from a database.

The retrieved GPS data may be filtered and/or otherwise processed. The GPS data may be filtered based on time, such as by retrieving GPS data collected within a pre-determined range of time and/or by retrieving a pre-determined amount of most recently collected GPS data. Outliers may be removed from the GPS data, such as by removing GPS coordinates that are distant from other collected GPS coordinates.

The data indicating the locations of roads may be a map of the geographic area. The map may indicate locations of roads in the geographic area and/or coordinates corresponding to roads in the geographic area. The map data may be used instead of the GPS data and/or in addition to the GPS data. Any other indicator of the locations of roads in the geographic area may be retrieved.

Step 520: Identify Roads in the Satellite Image

At step 520 roads may be identified in the satellite image captured at step 505. Pixels, coordinates, and/or other indicators corresponding to roads may be determined. The roads may be identified using computer vision techniques, MLAs, and/or any other techniques for identifying roads in an image. A pixel may be labelled as a road pixel based on the color of the pixel and/or the color of pixels surrounding the pixel.

A trained MLA, such as a trained neural network, may be used to identify the pixels corresponding to roads in the satellite image. The MLA may receive the satellite image as input. The MLA may output a set of pixels corresponding to the roads in the satellite image and/or any other indicator of the pixels that correspond to roads in the satellite image. The MLA may have been trained using labelled training data that includes a set of training data points. Each training data point may include a satellite image and a map or other label that indicates which pixels in the satellite image correspond to roads. The MLA may be trained, using the labelled training data, to predict which pixels in a satellite image correspond to roads.

Step 525: Determine a Shift to Apply to the Satellite Image

At step 525 a shift may be determined to apply to the satellite image. The shift may be applied to the satellite image itself and/or all RPCs corresponding to the satellite image. An amount and/or direction of shift (such as a vector) may be determined. The determined shift may then be applied to all RPCs of the satellite image.

The amount and/or direction of shift to apply may be determined by comparing the GPS data to the identified roads in the satellite image. A measure of overlap between the GPS data and the roads may be determined. The measure of overlap may be a measure of intersection over union (IoU), such as the Jaccard index. The measure of IoU may indicate an amount of pixels of the satellite image that are common to both the GPS data and the roads identified at step 520.

A set of variants of the satellite image may be generated, where each variant has a different shift applied to the RPCs of the satellite image. The variants may have different directions and/or amounts of shift. For each variant, an amount of overlap between roads in the satellite image and the GPS data may be calculated. The variant that has the highest amount of overlap between GPS data and roads, which may be considered the lowest amount of error, may be selected. The shift for that selected variant may be applied to the RPCs of the satellite image. Actions that may be taken to determine the amount of shift to apply are further described in the method 600 in FIG. 6, which is described in further detail below.

Step 530: Adjust Pixels of the DEM

At step 530 the DEM may be adjusted. The DEM may be adjusted to increase the amount of overlap between the GPS data and the roads in the satellite image. The pixel value of individual pixels of the DEM may be adjusted, such as by increasing or decreasing the brightness of an individual pixel.

An individual pixel of the DEM may be selected. A set of candidate pixels may be generated for the individual pixel. All or a portion of the satellite image may be orthorectified using all or a portion of the DEM with the candidate pixel values applied. For each orthorectified image generated using a candidate pixel value, an amount of overlap may be determined between roads in the orthorectified satellite image and GPS data. The candidate pixel value that causes the highest amount of overlap may be selected. This process may continue for all pixels of the DEM or a subset of the pixels of the DEM. For example pixels in the DEM that are on or surrounding the roads identified at step 520 may be adjusted using this process, whereas pixels in the DEM that are not surrounding roads might not be selected.

Steps that may be taken to adjust the DEM are described in the method 700 in FIG. 7 and the method 800 in FIG. 8, which are described in further detail below.

Each pixel of the satellite image that was identified at step 520 as being part of a road may be compared to the recorded GPS data. A set of pixels that were identified as being part of a road but do not match the recorded GPS data may be identified. For each pixel in the set of pixels that is not aligned with the GPS data, the pixel value of the corresponding pixel in the DEM and/or the pixel value of pixels in the DEM surrounding the corresponding pixel may be adjusted so that the pixel in the satellite image is aligned with the GPS data.

In order to adjust the pixel values of the pixel and the pixels surrounding the pixel in the DEM, the pixel values may be randomly altered until the pixel in the satellite image is aligned with the GPS data. Various altered versions of the DEM may be generated. Each altered version of the DEM may be used to orthorectify the satellite image. RPCs may be generated for the satellite image based on the altered versions of the DEM. The RPCs may be used to verify whether the road pixel in the satellite image is aligned with the GPS data. After the pixel in the satellite image is aligned, the DEM with the adjusted pixel values may be stored.

Step 535: Generate a Corrected Satellite Image

At step 535 a corrected satellite image may be generated. The corrected satellite image may be generated using the adjusted DEM generated at step 530. The adjusted DEM may be used to orthorectify the satellite image captured at step 505. Compared to the original satellite image captured at step 505, the corrected satellite image may have a greater amount of overlap between the recorded GPS data and the identified roads in the satellite image. FIG. 4 illustrates an example of a satellite image that has been corrected by adjusting the DEM to increase the amount of overlap between roads in the satellite image and GPS data.

Step 540: Store the Corrected Satellite Image

At step 540 the corrected satellite image may be stored. The adjusted DEM, RPCs, and/or any other data related to the satellite image may also be stored. The corrected satellite image may be used for various purposes, such as for navigation by a self-driving car or other vehicle.

Method for Correcting a Satellite Image
(Non-Limiting Embodiment)

Figure 6:
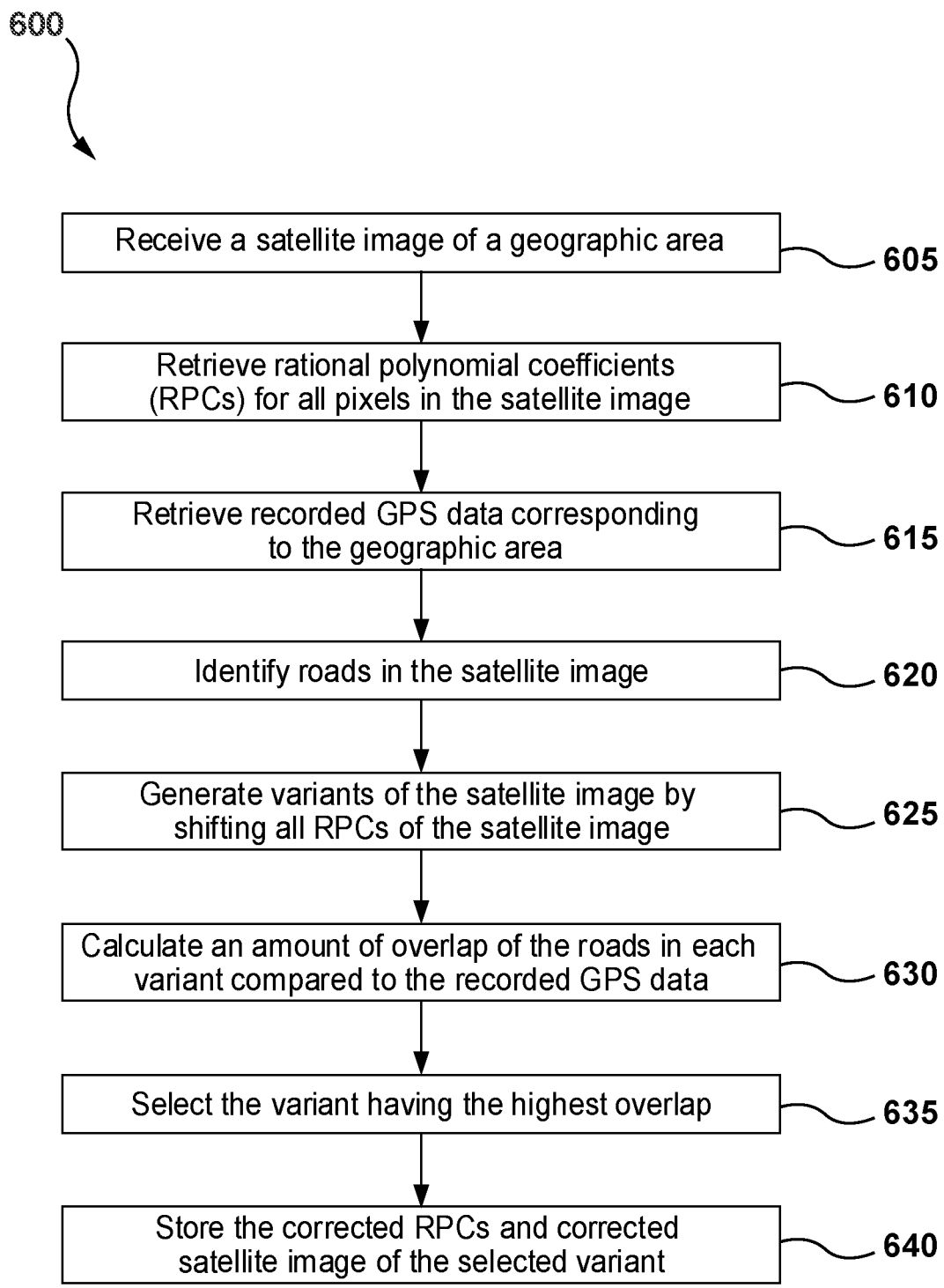
FIG. 6 is a flow diagram of a method for determining a shift to apply to a satellite image according to some embodiments of the present technology.

FIG. 6 is a flow diagram of a method 600 for determining a shift to apply to a satellite image according to some embodiments of the present technology. In one or more aspects, the method 600 or one or more steps thereof may be performed by a computing system, such as the computer system 100. The method 600 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order Step 605: Receive Satellite Image of a Geographic Area At step 605 a satellite image of a geographic area may be captured, retrieved, generated, and/or received. Actions taken at step 605 may be similar to those described above with respect to step 505 of the method 500.

Step 610: Retrieve RPCs for the Satellite Image

At step 610 RPCs for the satellite image may be received, retrieved, and/or generated. The RPCs may indicate, for each pixel of the satellite image, a corresponding physical location on the earth. The RPCs may be used to generate a set of geographic coordinates (e.g. a latitude and longitude) corresponding to an individual pixel.

Step 615: Retrieve Recorded GPS Data

At step 615 previously recorded GPS data may be retrieved. Actions taken at step 615 may be similar to those described above with respect to step 515 of the method 500. The GPS data may have been previously recorded by GPS devices in vehicles traveling in the geographic area. The GPS data may comprise sets of coordinates that were recorded by the GPS devices while traveling over roads in the geographic area. As described above with regard to step 515, in some instances map data may be retrieved instead of or in addition to the recorded GPS data.

Step 620: Identify Roads in the Satellite Image

At step 620 roads may be identified in the satellite image. Pixels, coordinates, and/or other indicators corresponding to roads may be determined. Actions taken at step 620 may be similar to those described above with respect to step 520 of the method 500. A trained MLA, such as a trained neural network, may be used to identify the pixels that correspond to roads in the satellite image. The MLA may receive the satellite image as input and output an indication of the pixels in the satellite image that are predicted to contain roads.

Step 625: Generate Variants of the Satellite Image

At step 625 variants of the satellite image may be generated. Any number of variants may be generated. A predetermined number of variants may be generated. A set of shifts may be generated or retrieved, where each shift comprises a direction of shift and/or an amount of shift. The shifts may be in the format of a vector. For each of the shifts, a variant of the satellite image may be generated by applying the shift to the satellite image and/or to all RPCs of the satellite image. For example if instructions are retrieved for three shifts to be applied to the satellite image, three variants of the satellite image may be generated where the first shift is applied to all RPCs of the satellite image to generate the first variant, the second shift is applied to all RPCs to generate the second variant, and the third shift is applied to all RPCs to generate the third variant.

A pre-determined range may be used to generate the shifts, where the range may include a maximum and minimum amount to shift the pixels of the satellite image on the X and Y axes. For example the range may be −8 to 8 pixels on the X-axis and −8 to 8 pixels on the Y-axis.

Step 630: Calculate Overlap for Each Variant

At step 630 an amount of overlap may be calculated for each variant generated at step 625. Pixels corresponding to the recorded GPS data retrieved at step 615 may be determined. All pixels in the satellite image that are covered by the GPS data may be determined. The amount of overlap may indicate a number of common pixels between the pixels covered by the GPS data and the pixels corresponding to roads in the satellite image identified at step 620. The amount of overlap may be determined using pixels, coordinates, or any other format. For example, the pixels corresponding to the identified roads may be converted, using the corresponding RPCs, to coordinates in a same format as the recorded GPS data. After both sets of data are in coordinate format, an amount of overlap between the two sets of data may be determined.

For each variant generated at step 625, two datasets may be generated. The first dataset may contain pixels corresponding to the recorded GPS data. The second dataset may contain the pixels that were identified as forming a part of roads in the satellite image. The two datasets may be placed in a same format so that the overlap between the two datasets may be determined.

The dataset containing the recorded GPS data may contain the data retrieved at step 615. This dataset may be in the format of GPS coordinates, which may include a latitude and longitude. The same dataset of GPS data may be used to determine the amount of overlap for all variants.

The dataset containing the identified roads may be different for each variant. For each variant, the pixel locations of roads determined at step 620 may be converted to coordinates using the RPCs for the individual variant. Because a different amount of shift has been applied to each variant, the resulting coordinates will be different for each variant. After generating both datasets in a coordinate format, the overlap between the two datasets may be determined for a variant. Rather than comparing the datasets in coordinate format, the recorded GPS data may be converted to pixel format by determining all pixels of the satellite image covered by the GPS data. The overlap may then be determined by identifying the number of common pixels between the GPS data and the identified roads.

The overlap for a variant may be calculated by determining an amount of Intersection over Union for the two datasets, such as by calculating the Jaccard index for the two datasets. Any other indicator of a difference between the two datasets may be used. The overlap may be output in any format, such as a numeral indicating an amount of overlap between the two datasets. The amount of overlap may be stored for each variant.

Step 635: Select Variant Having Highest Overlap

At step 635 the variant having the highest amount of overlap may be selected. The RPCs corresponding to this variant may be selected as the RPCs for the satellite image. Because this variant has the highest amount of overlap, it may be considered to have the lowest amount of error and/or be the most accurate variant of the satellite image. The roads in the satellite image in the selected variant may be closest, of the variants, to the actual physical location of the roads.

Step 640: Store the Corrected RPCs

At step 640 the corrected RPCs and/or corrected satellite image may be stored. The corrected RPCs may be the RPCs from the selected variant. The corrected satellite image may be the satellite image generated using the RPCs of the selected variant. The corrected satellite image having the selected shift applied may be stored.

Method for Correcting a Satellite Image
(Non-Limiting Embodiment)

Figure 7:
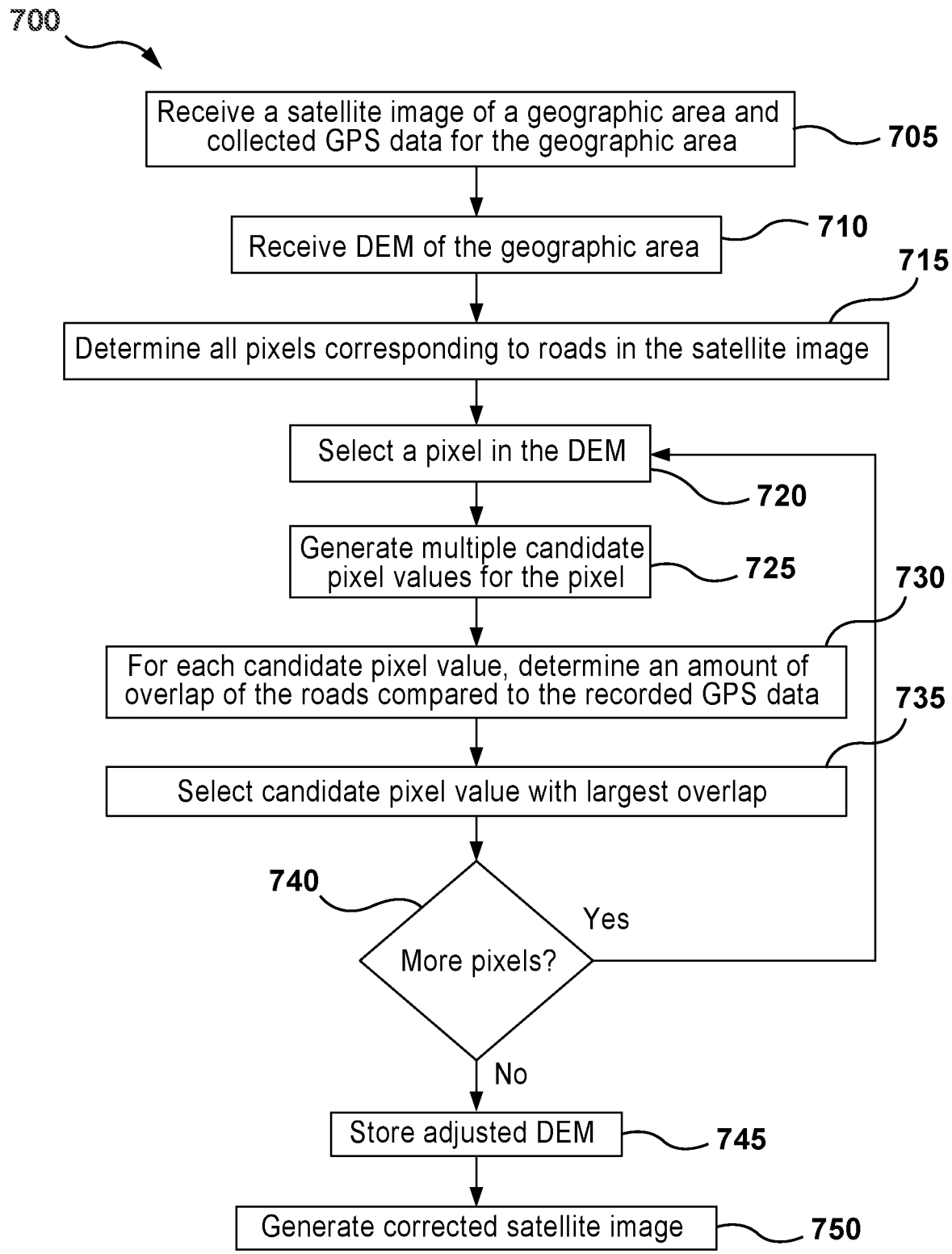
FIG. 7 is a flow diagram of a method for adjusting a DEM of a satellite image according to some embodiments of the present technology.

FIG. 7 is a flow diagram of a method 700 for adjusting a DEM of a satellite image according to some embodiments of the present technology. In one or more aspects, the method 700 or one or more steps thereof may be performed by a computing system, such as the computer system 100. The method 700 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

Step 705: Receive Satellite Image of a Geographic Area

At step 705 a satellite image of a geographic area may be captured, retrieved, generated, and/or received. Actions taken at step 705 may be similar to those described above with respect to step 505 of the method 500. GPS data collected in the geographic area may be received. The GPS data may be coordinates measured by GPS devices traveling on roads in the geographic area, such as GPS devices integrated in vehicles or traveling in vehicles.

Step 710: Receive DEM of the Geographic Area

At step 710 a DEM of the geographic area may be captured, retrieved, generated, and/or received. Actions taken at step 710 may be similar to those described above with respect to step 510 of the method 500. The DEM may be in the format of an image consisting of pixels. Each pixel may correspond to a physical location in the geographic area. Each pixel may have a pixel value, which may be the brightness of the pixel. The pixel value may indicate an elevation of the physical location corresponding to that pixel. As described above, the DEM may be used to orthorectify the satellite image.

Step 715: Determine All Pixels Corresponding to Roads in the Satellite Image

At step 715 all pixels corresponding to roads in the satellite image may be determined. Actions performed at step 715 may be similar to those described above with respect to step 520. In some instances, the method 700 may be performed after the method 600. In that case, steps 705 and 715 might not be performed, as similar steps may have been performed at steps 605 and 620 of the method 600. As described above with regard to step 520, pixels in the satellite image corresponding to roads may be identified using an MLA, such as a neural network trained to identify road pixels in a satellite image. The location or any other indicator of each pixel that corresponds to a road may be stored.

Step 720: Select a Pixel in the DEM

At step 720 one of the pixels in the DEM may be selected. Any pixel in the DEM may be selected. In some instances, pixels in the DEM corresponding to roads may be selected and pixels in the DEM that do not correspond to roads might not be selected. It may be more efficient to select pixels corresponding to roads, without processing pixels that do not correspond to roads. To select pixels corresponding to roads, pixels in the DEM that are matched with the road pixels in the satellite image determined at step 715 may be selected. Pixels surrounding the road pixels might also be selected. For example all pixels within a pre-determined distance of a road pixel may be selected. The pixels of the DEM may be selected in any order.

Step 725: Generate Candidate Pixel Values

At step 725 candidate pixel values may be generated for the pixel. The candidate pixel values may be altered pixel values for the pixel. A set of candidate pixel values may be generated and then, from the set, a single pixel value may be selected and assigned to the pixel.

Various techniques may be used to generate candidate pixel values. An upper bound, lower bound, and/or an amount of candidate pixel values to generate may be pre-determined or determined dynamically. The candidate pixel values may be evenly spaced throughout the range, based on the specified amount of pixel values to generate. The candidate pixel values may be generated randomly within the lower and upper bound.

The candidate pixel values may be generated based on the pixel values of pixels surrounding the pixel. A set of pixels surrounding the pixel selected at step 720 may be selected. For example all pixels within a pre-determined distance of the pixel may be selected. A smoothing algorithm may then be applied to the pixels surrounding the pixel to determine a pixel value of the pixel. The smoothing algorithm may be a Gaussian blur based algorithm and/or any other type of smoothing algorithm. The smoothing algorithm may generate the candidate pixel value as a weighted average of the surrounding pixels, where higher weights are assigned to pixels that are closer to the selected pixel.

Various smoothing algorithms may be applied and/or individual smoothing algorithms may be applied with various parameters. A plurality of candidate pixel values may be generated by the different smoothing algorithms and/or different parameters.

Step 730: Determine Amount of Overlap for Each Candidate Pixel Value

At step 730 an amount of overlap between the GPS data and the road pixels may be determined. The amount of overlap may be determined for the entire satellite image or for a smaller area surrounding the pixel. For example the amount of overlap may be determined for a 256×256 pixel area surrounding the pixel. Determining the amount of overlap for an area smaller than the entire satellite image may be faster and/or may use less resources than determining the amount of overlap for the entire satellite image.

A DEM may be generated for each candidate pixel value. The generated DEM may correspond to the area being used to determine the overlap. For example if the 256×256 pixel area surrounding the selected pixel is being used, the DEM may also be generated to be 256×256 pixels and/or to include elevations for all pixels in the 256×256 area. The candidate pixel value may be assigned to the selected pixel. The satellite image may then be orthorectified using the DEM generated for the candidate pixel value.

After orthorectifying the satellite image using the DEM, coordinates may be determined for each of the pixels corresponding to roads in the satellite image identified at step 715. The RPCs of the satellite image may be used to convert the road pixels to coordinates. An amount of overlap between those coordinates and the recorded GPS coordinates may be determined. Actions taken at step 730 to determine an amount of overlap may be similar to those described above with regard to step 630 of the method 600.

Step 735: Select Candidate Pixel Value With Largest Overlap

At step 735 the candidate pixel value having the largest amount of overlap determined at step 730 may be selected. The selected candidate pixel value may be assigned to the pixel. This selected value may replace the original value of the pixel in the DEM.

Step 740: Determine if There are More Pixels to Process

At step 740 a determination may be made as to whether there are more pixels to process, or whether all pixels have been processed at steps 720-40. If there are more pixels to process, the method 700 may proceed to step 720 and a next pixel may be selected. Otherwise, if all pixels have been processed by the steps 720 to 735, then the method 700 may proceed to the method 745.

As described above, the method 700 may process all pixels of the DEM and/or a subset of the pixels of the DEM at steps 720-740. In some instances, pixels in the DEM that match pixels corresponding to roads in the satellite image may be selected at step 720 and processed. It may be more efficient to process pixels corresponding to roads rather than processing all pixels in the DEM.

Step 745: Store Adjusted DEM

At step 745 an adjusted DEM may be stored. For some or all of the pixels in the DEM received at step 710, the original pixel values of those pixels in the DEM may be replaced by the candidate pixel values selected at step 735. The brightness of individual pixels in the DEM may be adjusted based on the candidate pixel values selected at step 735.

Step 750: Generate Corrected Satellite Image

At step 750 the satellite image received at step 705 may be orthorectified with the adjusted DEM to generate a corrected satellite image. The amount of overlap between GPS data and roads in the corrected satellite image may be higher than the amount of overlap between GPS data and roads in the original satellite image. The corrected satellite image may be stored and used for any suitable purpose, such as for navigation purposes. The corrected satellite image may be used by an autonomous vehicle, such as a self-driving car (SDC), for navigation.

Method for Generating an Adjusted DEM
(Non-Limiting Embodiment)

Figure 8:
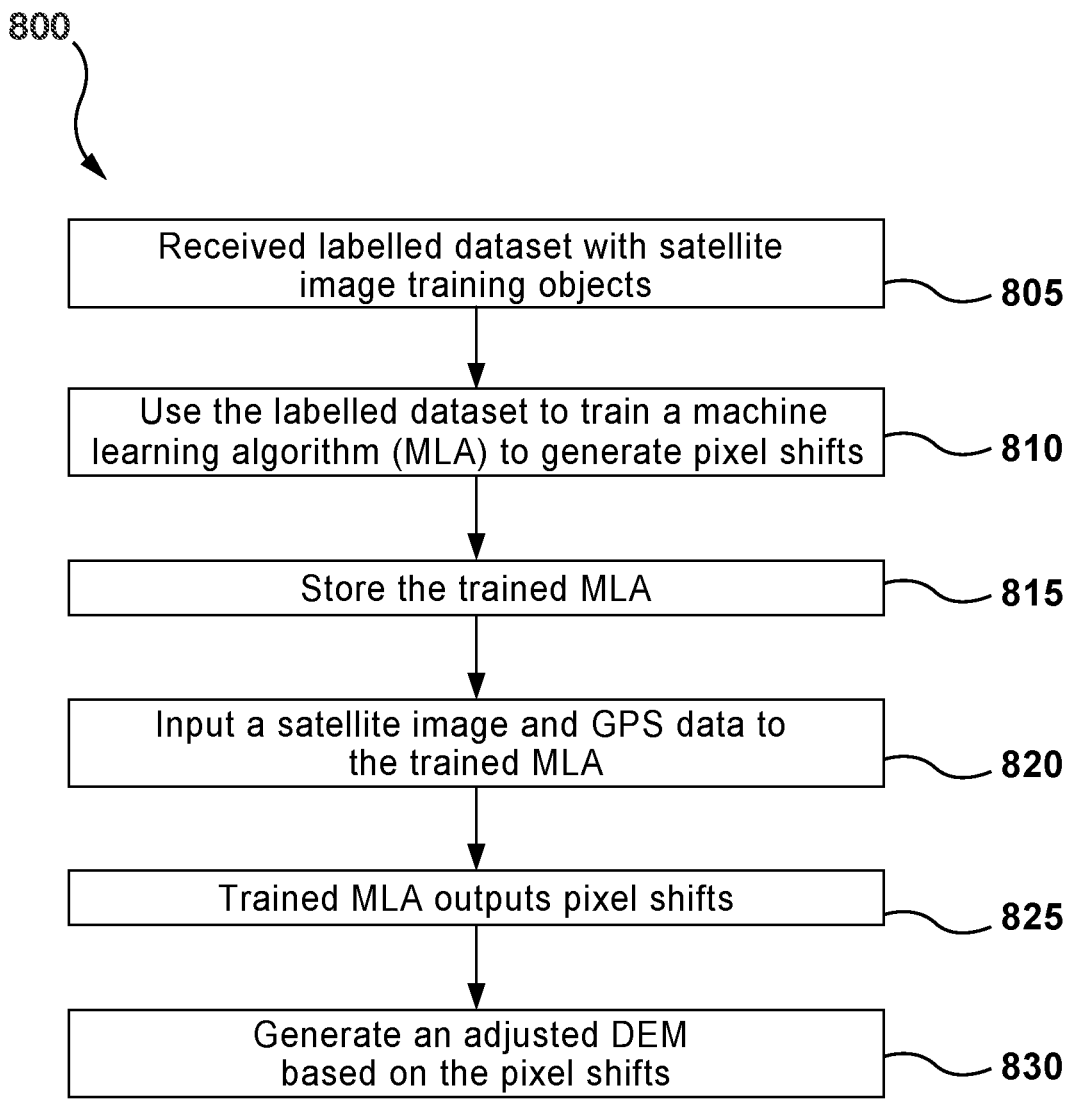
FIG. 8 is a flow diagram of a method for generating an adjusted DEM using a machine learning algorithm (MLA) according to some embodiments of the present technology.

FIG. 8 is a flow diagram of a method 800 for generating an adjusted DEM using an MLA according to some embodiments of the present technology. In one or more aspects, the method 800 or one or more steps thereof may be performed by a computing system, such as the computer system 100. The method 800 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

Step 805: Receive Labelled Dataset

At step 805 a labelled dataset of satellite images may be received. The dataset may include multiple training objects. Each training object may include a satellite image with recognized roads, a set of reference roads corresponding to the satellite image, and a label.

The satellite image with recognized roads may be a satellite image of a geographic area containing roads. The recognized roads may be recognized using an MLA. Step 520 of the method 500, described above, describes actions that may be performed to identify roads in a satellite image. The MLA may output a set of coordinates and/or a set of pixels corresponding to recognized roads in the satellite image. The coordinates may be latitude and longitude coordinates corresponding to the pixels identified as roads.

The set of reference roads may be generated based on collected GPS data from vehicles traveling over the roads. The reference roads may be overlaid on the satellite image. The reference roads may be in any suitable format, such as a set of latitude and longitude coordinates corresponding to the roads. The reference roads may be generated based on a map of the geographic area. The map may show the location of roads in the geographic area.

The label may indicate pixel shifts that move the recognized roads to the reference roads. The label may be a set of instructions for shifting pixels in the satellite image. Each instruction may include a reference to a pixel or set of pixels in the satellite image, and a shift to apply to the pixels. The shift may be in the form of a vector or any other suitable format.

Step 810: Train the MLA

At step 810 an MLA may be trained based on the labelled dataset. The MLA may be any type of MLA, such as a neural network, tree-based MLA, and/or any other type of MLA or combination of types of MLA. The MLA may be a convolutional neural network.

The training objects may be used to train the MLA. To train the MLA, the satellite image with recognized roads and the reference roads of a training object may be input to the MLA. The MLA may output a predicted set of pixel shifts for the training object. The predicted set of pixel shifts, and pixel shifts from the training object's label, may be input to a loss function. The loss function may compare the pixel shifts from the label to the predicted pixel shifts. The loss function may output an indicator of a difference between the predicted pixel shifts and pixel shifts from the label. The MLA may then be adjusted based on the output of the loss function. The MLA may be adjusted to minimize the difference between the predicted pixel shifts and pixel shifts from the label for future predictions.

Step 815: Store the Trained MLA

At step 815 the trained MLA may be stored. After training the MLA, the MLA may be stored. A portion of the labelled dataset may be used as a validation set. The validation set might not be used for training the MLA. The validation set may be used for testing the MLA. The MLA may be used to predict pixel shifts for each training object in the validation set. The loss function may be used to calculate a difference between the predicted pixel shifts and pixel shifts from the label for each training object in the validation set. An average amount of loss may be calculated for the training objects in the validation set. The training of the MLA may be stopped when the average amount of loss is below a threshold amount of loss. The threshold amount of loss may be a pre-determined threshold.

Step 820: Input Satellite Image to MLA

At step 820 the MLA may be used to predict pixel shifts for a satellite image. Steps 805-15 of the method 800 may be referred to as the "training phase" of the MLA. Steps 820-30 may be referred to as the "in-use phase" of the MLA. A satellite image with recognized roads may be input to the MLA. Reference roads corresponding to the satellite image may be input to the MLA. The reference roads may be collected GPS data from vehicles traveling over roads in the satellite image. The satellite image with recognized roads and reference roads may be in a same format as the data in the training objects.

Step 825: MLA Outputs Pixel Shifts

At step 825 the MLA may output a set of pixel shifts corresponding to the data input at step 820. The pixel shifts may be output in a same format as the labels in the training data points. The pixel shifts may be a set of instructions, where each instruction indicates a pixel or set of pixels in the satellite image to shift, and a shift to apply to those pixels.

STEP 830: Generate an adjusted DEM based on the pixel shifts

At step 830 an adjusted DEM for the satellite image may be generated based on the pixel shifts. A DEM corresponding to the satellite image that was input to the MLA may be received. Adjustments for the DEM may be determined based on the pixel shifts. The RPCs of each pixel may be used to calculate the adjustments for the DEM. The brightness of individual pixels in the DEM may be adjusted. The adjusted DEM may be stored.

It should be apparent to those skilled in the art that at least some embodiments of the present technology aim to expand a range of technical solutions for addressing a particular technical problem, namely adjusting a satellite image based on collected GPS data.

It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method comprising:
receiving a satellite image comprising one or more roads and a digital elevation model (DEM) comprising an elevation of each pixel of the satellite image;
receiving recorded global positioning system (GPS) data corresponding to the one or more roads;
determining a pixel in the satellite image corresponding to the one or more roads;
determining whether a location of the pixel in the satellite image corresponds to the GPS data;
after determining that the location of the pixel in the satellite image does not correspond to the GPS data, determining a set of pixels of the DEM that surround the pixel in the satellite image;
randomly selecting elevations for each pixel of the set of pixels;
applying the randomly selected elevations to the DEM;
after applying the randomly selected elevations to the DEM, determining an adjusted location of the pixel;
determining whether the adjusted location of the pixel in the satellite image corresponds to the one or more roads; and after determining that the adjusted location of the pixel in the satellite image corresponds to the one or more roads, storing the randomly selected elevations in the DEM.

2. The method of claim 1, further comprising:
determining a second set of pixels corresponding to roads in the satellite image; and
selecting, from the second set of pixels corresponding to roads in the satellite image, the pixel in the satellite image.

3. The method of claim 2, wherein determining the second set of pixels corresponding to roads in the satellite image comprises:
inputting the satellite image into a trained machine learning algorithm (MLA); and
outputting, by the MLA, the second set of pixels corresponding to roads in the satellite image.

4. The method of claim 3, wherein the trained MLA was trained using a set of satellite images, wherein each satellite image in the set of satellite images comprises a label indicating which pixels of the respective satellite image correspond to roads in the respective satellite image.

5. The method of claim 1, further comprising determining a rational polynomial coefficient (RPC) corresponding to the pixel in the satellite image.

6. The method of claim 5, wherein determining whether the location of the pixel in the satellite image corresponds to the GPS data comprises:
determining, based on the RPC, a GPS coordinate corresponding to the pixel in the satellite image; and
comparing the GPS coordinate of the pixel in the satellite image to the GPS data to determine whether the GPS coordinate corresponds to a road.

7. The method of claim 6, wherein determining whether the location of the adjusted pixel in the satellite image corresponds to the one or more roads comprises:
determining a second RPC corresponding to the adjusted pixel in the satellite image;
determining, based on the second RPC, a second GPS coordinate corresponding to the adjusted pixel in the satellite image; and
comparing the second GPS coordinate of the adjusted pixel in the satellite image to the GPS data to determine whether the second GPS coordinate corresponds to a road.

8. The method of claim 1, wherein the recorded GPS data comprises GPS coordinates recorded by a plurality of electronic devices traveling on the one or more roads.

9. The method of claim 8, wherein the plurality of electronic devices are associated with vehicles traveling on the one or more roads.

10. The method of claim 1, wherein the recorded GPS data is generated by:
receiving GPS coordinates recorded by a plurality of vehicles traveling on the one or more roads; and
removing outliers from the GPS coordinates.

11. A method comprising:
receiving a satellite image comprising one or more roads and a digital elevation model (DEM) comprising an elevation of each pixel of the satellite image;
receiving recorded global positioning system (GPS) data corresponding to the one or more roads;
determining, based on the GPS data, a shift to apply to the satellite image;
selecting a pixel in the DEM;
determining, based on pixels surrounding the pixel, a plurality of candidate pixel values of the pixel;
determining, for each candidate pixel value of the plurality of candidate pixel values, an amount of error corresponding to the respective candidate pixel value;
selecting a candidate pixel value having a lowest amount of error of the plurality of candidate pixel values; and
generating, based on the selected candidate pixel value, an adjusted DEM.

12. The method of claim 11, further comprising, generating, based on the adjusted DEM, a corrected satellite image.

13. The method of claim 11, further comprising receiving rational polynomial coefficients (RPCs) corresponding to the satellite image, and wherein determining the shift to apply to the satellite image comprises:
generating a plurality of variants of the RPCs;
determining, for each variant of the plurality of variants, an amount of error based on the GPS data;
selecting a variant of the plurality of variants having a smallest amount of error, wherein the variant corresponds to the shift; and
applying the shift to the RPCs.

14. The method of claim 11 wherein determining the plurality of candidate pixel values comprises applying a smoothing algorithm to the pixel and the pixels surrounding the pixel.

15. The method of claim 11, wherein determining the amount of error comprises determining an indication of overlap between the one or more roads and the GPS data.

16. A method comprising:
receiving a satellite image comprising one or more roads, a digital elevation model (DEM) comprising an elevation of each pixel of the satellite image;
receiving recorded global positioning system (GPS) data corresponding to the one or more roads;
selecting a pixel in the DEM;
generating a plurality of candidate pixel values of the pixel;
determining, for each candidate pixel value of the plurality of candidate pixel values, an amount of error corresponding to the respective candidate pixel value;
selecting a candidate pixel value having a lowest amount of error of the plurality of candidate pixel values; and
generating, based on the selected candidate pixel value, an adjusted DEM.

17. The method of claim 16, wherein determining the amount of error for a respective candidate pixel value comprises:
determining a set of pixels surrounding the pixel;
determining, for the set of pixels, an amount of overlap between the GPS data and the set of pixels; and
determining, based on the amount of overlap, the amount of error for the respective candidate pixel value.

18. The method of claim 16, wherein each candidate pixel value is within a pre-determined range of the pixel.

19. The method of claim 16, further comprising, generating, based on the adjusted DEM, a corrected satellite image.

20. The method of claim 11, wherein generating the adjusted DEM comprises replacing the pixel with the selected candidate pixel value.

* * * * *